Feb. 1, 1927.  
E. C. WEISGERBER  
1,616,209  
METHOD OF AND MEANS FOR TREATING OILS  
Filed March 11, 1925    5 Sheets-Sheet 1
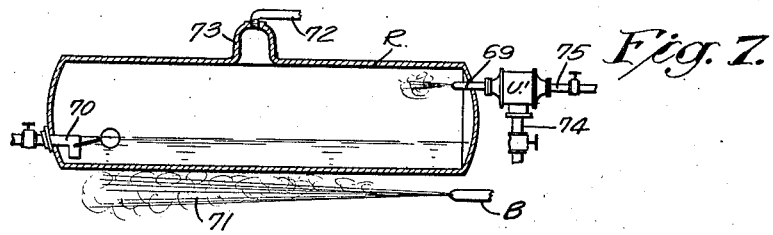
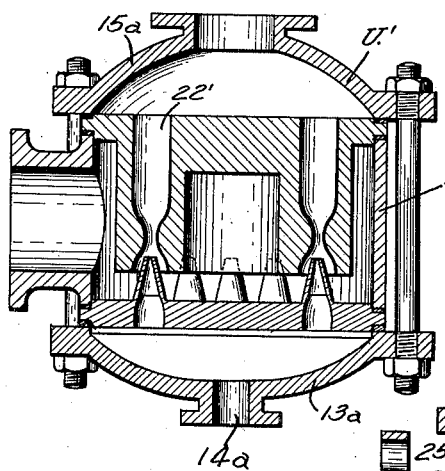
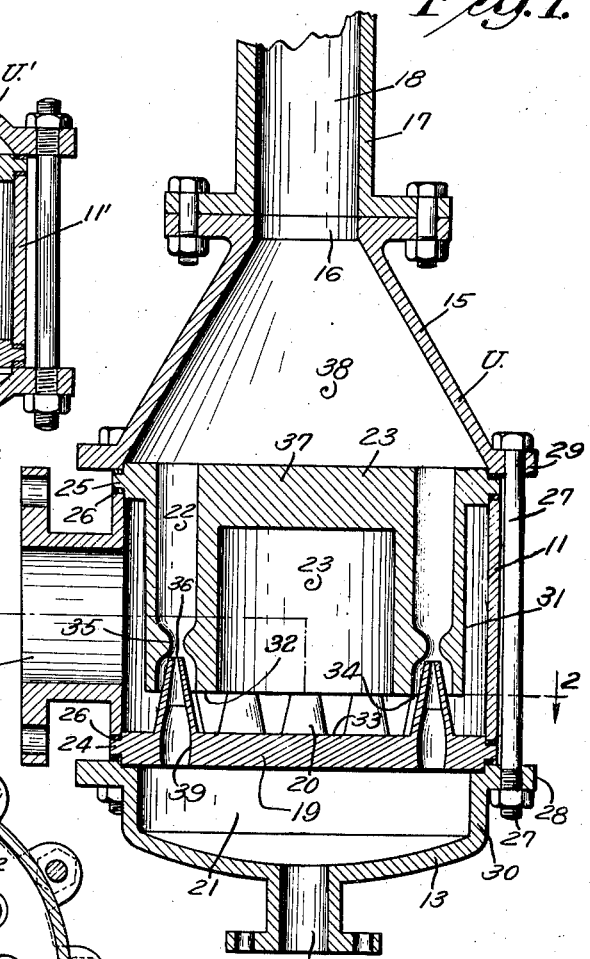
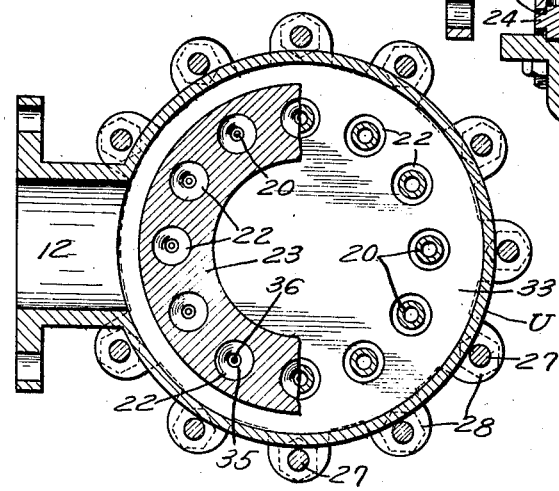
INVENTOR  
EDWIN C. WEISGERBER  
BY  
ATTORNEY Feb. 1, 1927. 1,616,209
E. C. WEISGERBER
METHOD OF AND MEANS FOR TREATING OILS
Filed March 11, 1925  5 Sheets-Sheet 2
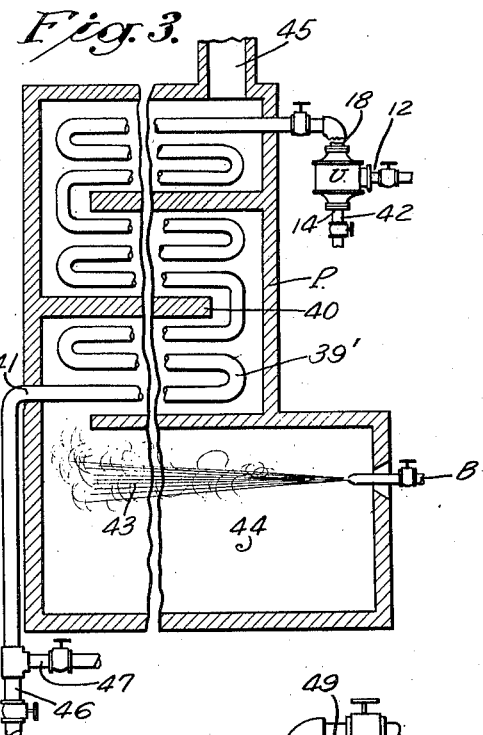
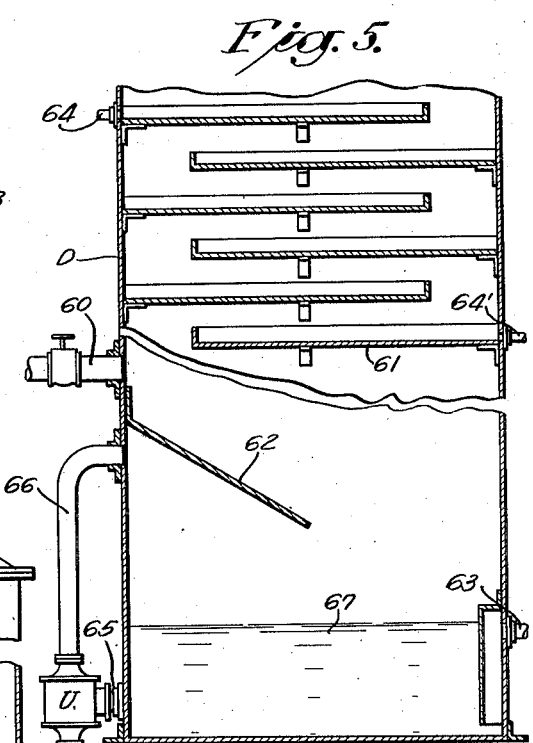
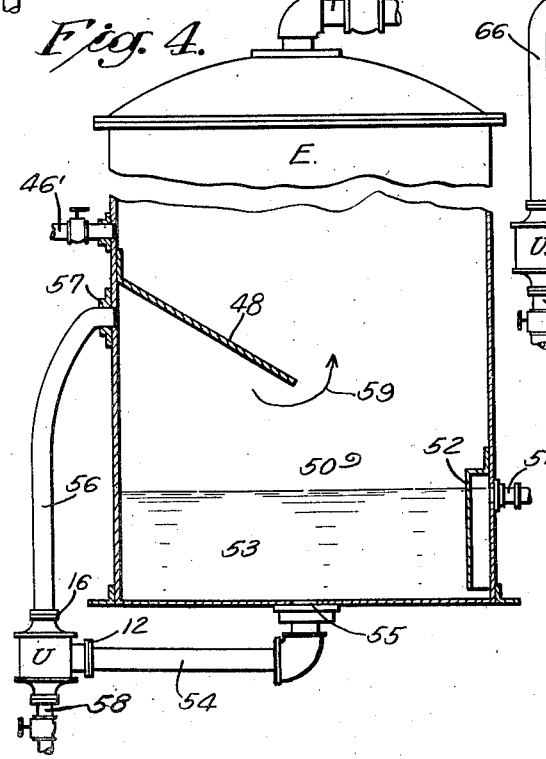
INVENTOR
EDWIN C. WEISGERBER
BY
ATTORNEY

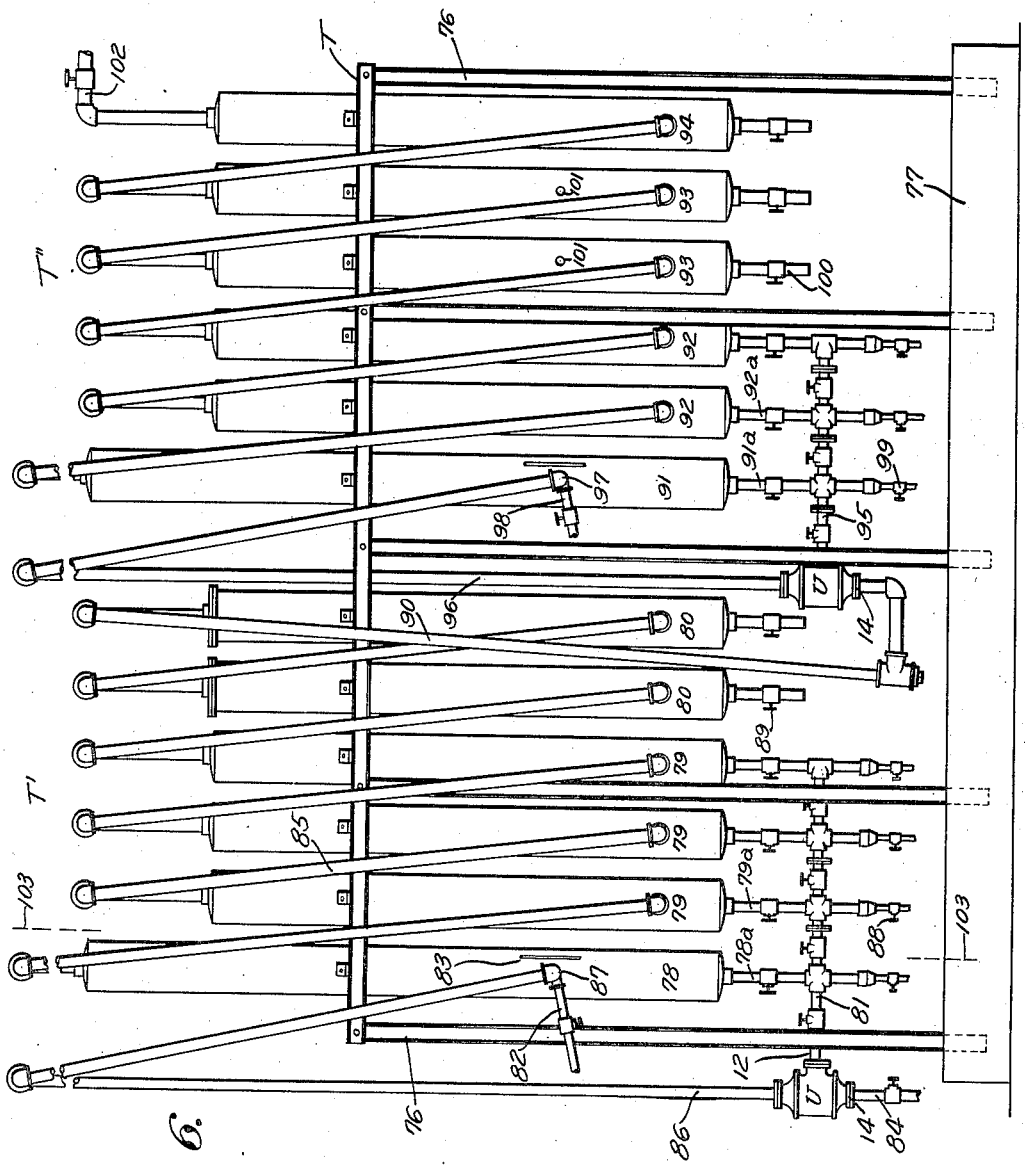

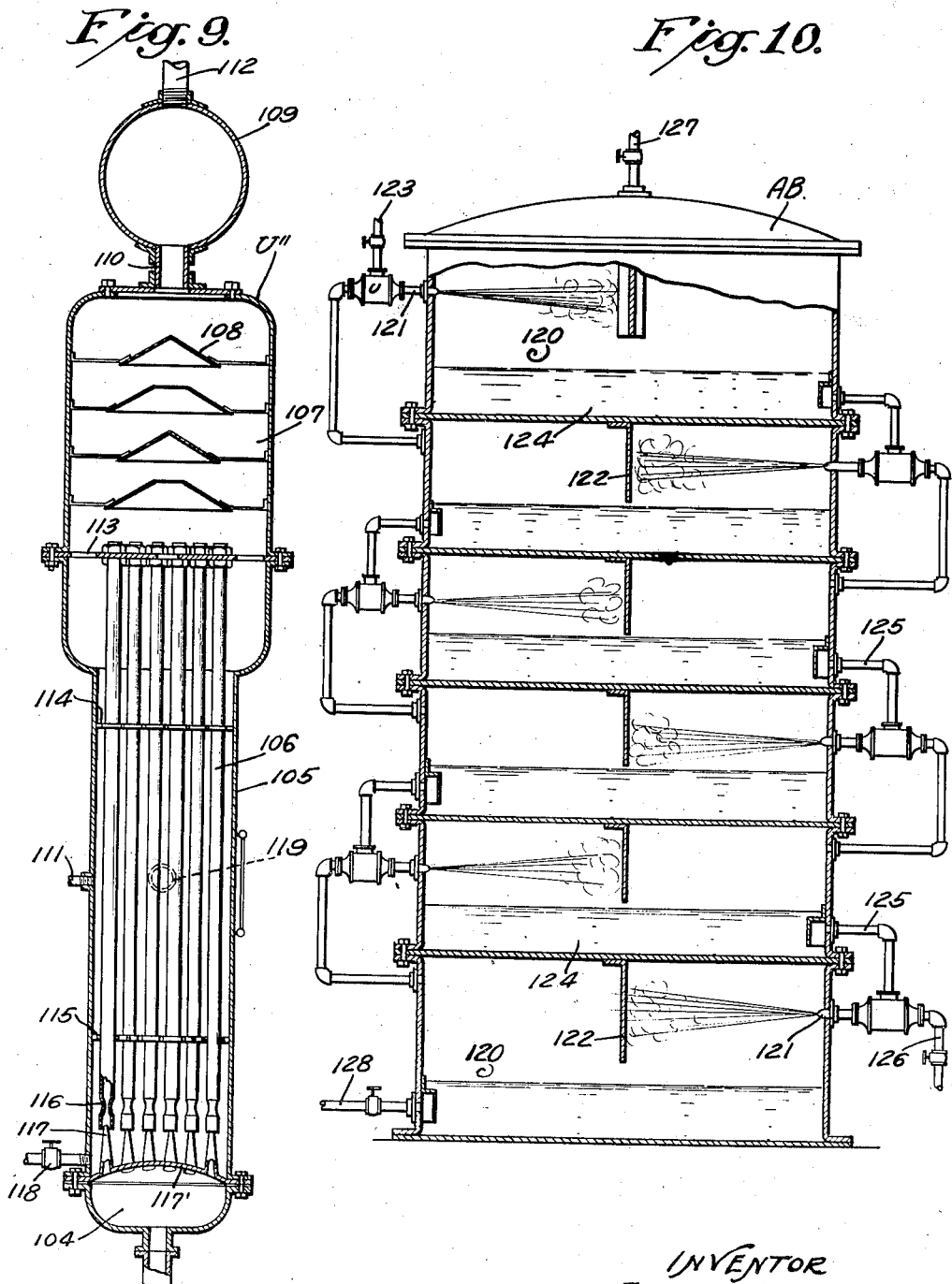

Feb. 1, 1927.

E. C. WEISGERBER 1,616,209

METHOD OF AND MEANS FOR TREATING OILS

Filed March 11, 1925      5 Sheets-Sheet 5

INVENTOR
EDWIN C. WEISGERBER
BY
ATTORNEY

Patented Feb. 1, 1927.

1,616,209

UNITED STATES PATENT OFFICE.

EDWIN C. WEISGERBER, OF LONG BEACH, CALIFORNIA, ASSIGNOR TO PETROLEUM APPLIANCE SYNDICATE, OF LOS ANGELES, CALIFORNIA, A BUSINESS TRUST.

METHOD OF AND MEANS FOR TREATING OILS.

Application filed March 11, 1925. Serial No. 14,706.

Although my present invention is referred to as relating to means for and methods of treating oils, it may be stated at the outset that the means and methods herein described are capable of a great variety of uses. My invention may be regarded as relating somewhat broadly to means and methods for promoting interaction of fluids, although I herein describe the same with particular reference to the treatment of oils or oil mixtures.

It is an object of this invention to take advantage of various physical laws, including laws which govern turbulent flow and the relationship of velocity to pressure, in promoting interaction of fluids; and advantageous embodiments of my invention may comprise means and methods effective not only to produce fine initial subdivision and turbulent flow but to maintain such turbulent flow for a suitable interval of time.

It is an object of my invention to provide means and methods for expediting the attainment of equilibrium between interacting fluids, such as oils and steam (or water, or an acid, or an alkaline solution, or a gas, or air hot or cold) in which a fluid of a less density and greater fluidity may be used to produce some change in the purity or composition of a heavier fluid; and, for the purpose referred to, I may use means and methods wherein the lighter fluid, preferably projected at high velocity through spray-forming nozzles into tubular passages of limited diameter, is fed at a pressure sufficiently high that the effects of friction may be added to the mixing effects of turbulent flow and the surface-extending effects of fine subdivision, in expediting chemical or physical action between the fluids concerned. Preferred forms of my invention may accordingly combine the effects of suitable pressures and temperatures with the effects of friction, fine initial subdivision, and turbulent flow.

It is an object of this invention to provide means and methods whereby, when it is desired to bring a hydrocarbon oil, or the like, into a reacting relationship with steam, or another fluid, as for the purpose of hydrogenating or drying or otherwise improving the composition or condition of the same, or when it is desired to treat an oil or oil mixture with an acid or an alkali or other chemical or wash, or when an oil or an oil mixture is to be compounded or blended, or when all portions of an oil, or the like, are to be reliably heated to a predetermined temperature, a unit or units comprising parts broadly resembling those of a so-called steam pump may be advantageously used in intensively treating streams or threads of the mentioned oil or oil mixture; and the treatments here referred to, whether or not the same are used in conjunction with other treatments, and whether or not the mentioned units are externally disposed, may advantageously be so executed that any or all of the mentioned effects, with or without additional effects, may be simultaneously obtained in a continuous manner.

Other objects of my invention, as the same may be employed in separate treatments of different oils for various purposes, or as the same may be correlated in the production of predetermined end products from a single raw material, may be best understood from the following description of alternative embodiments thereof, taken in connection with the appended claims and the accompanying drawings, in which:

Fig. 1 is a vertical or longitudinal median section through an advantageous type of interaction unit, suitable for use in various connections, as illustrated in subsequent figures.

Fig. 2 is a transverse section, taken substantially as indicated by the line 2—2 of Fig. 1.

Fig. 3 is a diagrammatic vertical section, with parts broken away, showing an advantageous use of my invention in connection with a pipe still.

Fig. 4 is, for the most part, a diagrammatic vertical section, with parts broken away, through an evaporating tower in conjunction with which my invention may be advantageously used.

Fig. 5 is a diagrammatic vertical section through a dephlegmating column, in connection with which my invention may be similarly used.

Fig. 6 is a side elevational view of a gasoline treating organization in connection with which units of the character illustrated in Figs. 1 and 2 may also be advantageously employed.

Fig. 7 is a diagrammatic vertical section through a rerun still, in connection with which one or more embodiments of my invention may be advantageously employed, effecting distillation in a continuous manner.

Fig. 8 is a vertical section illustrating a type of unit similar to that disclosed in Figs. 1 and 2, this form being an early embodiment of my invention, capable of satisfactory use in, for example, an organization such as is disclosed in Fig. 7.

Fig. 9 is a vertical section through an alternative form of interaction unit, this form being suitable for optional use in conjunction with parts of an organization such as is disclosed in Fig. 6.

Fig. 10 is a vertical section through an organization using several of my interaction units in a manner favorable to the absorption of natural gas in a suitable absorber oil.

Figure 11:
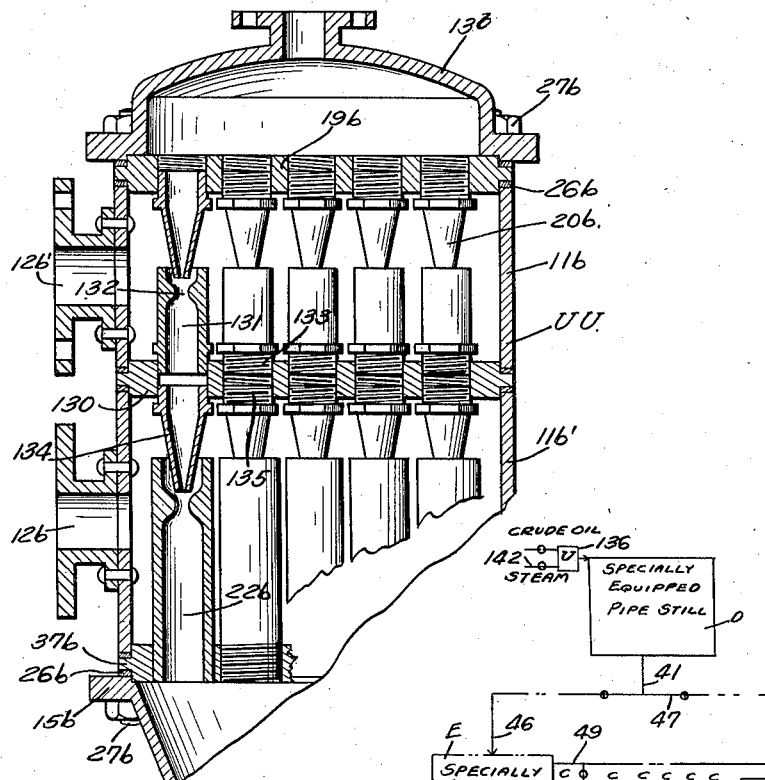
Fig. 11 is a diagrammatic sectional view, with parts broken away, through an optional alternative type of interaction unit, this form being suggested for use in promoting interaction between three or more fluids. This figure also illustrates optional features of adjustment.

Referring first to that advantageous type of interaction unit illustrated separately in Figs. 1 and 2, this unit may comprise a shell 11, provided with an inlet opening 12, at one side of the unit, an inlet end fitting 13, provided with an inlet opening 14, and an outlet end fitting 15, whose outlet opening 16 is shown as continuous with a tubular element 17, providing a longitudinal turbulence passage 18, corresponding in diameter to the outlet opening 16; and within the shell 11, I may secure, in any suitable manner, a plate 19, or its equivalent, adapted to support a plurality of nozzles 20, through which a fluid may be advanced from a chamber 21 within the end fitting 13, the nozzles 20 being shown as extending within separate tubular passages 22, which may be provided in a block 23, spaced from the plate 19 in any suitable way. For example, the plate 19 and the block 23 may each be provided with a reduced circumferential edge, as shown at 24 and 25, with which may be associated gaskets 26, or their equivalents, means such as bolts 27, shown as extending through flanges 28 and 29, integral respectively with the end fittings 13 and 15, being employed to hold all of the mentioned parts in their intended relationships.

Although the exact configuration of the parts referred to may be varied within wide limits, I prefer to give the inlet end fitting 13, or its equivalent, a sufficient capacity, as by providing the same with cylindrical walls 30, to assure a free delivery of a fluid of any ordinary consistency to the respective nozzles 20, or their equivalents. By distributing the mentioned nozzles in a circular peripheral row, an equalization of the delivery thereto may be assured; and by spacing the lateral walls 31 of the block 23, or its equivalent, a sufficient distance from the shell 11, and by spacing the "lower" surface 32 of said block at a sufficient distance from the "upper" surface 33 of the plate 19, or its equivalent, and by providing a suitable clearance at 34, between the conical outer surface of each nozzle and the inner edge of the passage into which the same extends, I may assure a satisfactory delivery of the fluid admitted through the inlet 12, or its equivalent, into the respective passages 22. Each of these passages may advantageously be provided, as at 35, with an annular constriction, shown as positioned slightly in advance of the outlet orifice 36 of the inlet nozzle entering the same. It will be obvious that the central upper portion or plate 37 of the block 23, when no passages are provided therethrough, serves primarily to space the mentioned parts in their intended relationships and to restrict the flow of oil or other mixtures to the passages referred to; but, as suggested hereinafter, I may optionally employ separate tubes, inserted in an equivalent plate, to provide the passages 22, which are shown as delivering into a substantially conical chamber 38, leading to the outlet 16 and the restricted passage 18.

Although an interaction unit of the character described may be built on any desired scale, it will be understood to be an object of the nozzles 20, or their equivalents, to produce a fine spray or subdivision of the fluid admitted therethrough; and the bore of these nozzles may ordinarily be $\frac{1}{32}$ of an inch, or as small as can conveniently be provided; and I consider it important that the outlet 16 and the turbulence passage 18, or their equivalents, shall have a transverse area less than the sum of the transverse areas of the inlet passages 12 and 14, or their equivalents. For example, if the inlet 14 has a diameter of one inch, and the inlet 12 has a diameter of 4 inches, the outlet 16 may advantageously have a diameter not exceeding 4 inches, and preferably a diameter of 3 inches. The conical form of the outlet fitting 15 is advantageous as avoiding a useless back pressure; but there is believed to be an actual advantage in providing for some variations in diameter, the inlet area of fitting 15 being, for example, in the form shown, obviously greater than the sum of the transverse areas of the passages 22. Turbulence being favorable to prompt admixture and interaction of the fluids concerned, no effort need be made to "stream line" all passages; and I in fact consider it desirable to give the interior of the nozzles 20, or their equivalents, substantially the degree of concavity indicated at 39, this being a curvature corresponding to a 5 inch radius, in the case of a unit of the dimensions above suggested.

Other means might be substituted for my described organization for producing mixtures of finely subdivided fluids; but, in the use of an interaction unit of the character described, whether or not the fluids admitted respectively through the end inlet 14 and the side inlet 12 are under the same pressure, it will be understood that the fluid admitted through the inlet 14 (which may, for example, be steam) is intended to be jetted, by means of said nozzles, in a finely divided form; and the contraction of the passages surrounding each of the nozzles 20 and by which fluid (which may be a crude or other oil) is admitted to a unit of the character described, must also have the effect of producing an extensive interacting surface.

It is of course well known that jetting or otherwise forcing a fluid through a constriction produces both a frictional effect and a reduction of pressure at the point of constriction (as in the Venturi meter). Fine subdivision, extensive surface, friction, and reduction in pressure, are, generally speaking, all favorable to chemical and physical interaction; and a maintenance or augmentation of these conditions, whether or not one of the introduced fluids is used for an entrainment effect—to advance the other— and whether or not fluctuations in pressure are effected by means such as the constriction 35 and the slight expansion at the lower end of the chamber 38, is favored by advancing the subdivided mixture through a passage, such as the passages 22 and 18, so restricted as to assure, in view of the rate of admission of the mixture thereto, a turbulence of the fluid therein; and such turbulence is highly favorable not only to complete admixture but to further subdivision and rapid interaction.

In this connection, although it has heretofore been recognized (see, for example, Perry, Hydraulic Machinery, 1905; or Day, Handbook of the Petroleum Industry, 1922) that turbulent flow may result from the advance of any liquid through a pipe at a velocity in excess of a so-called "critical velocity" (at which the friction loss suddenly jumps from proportionality to velocity and becomes proportional to the square of velocity), I am unaware of any organization comparable to that above described, devised for the purpose of (1) first effecting a fine admixture of fluids and (2) then applying the laws which govern turbulent flow in maintaining or augmenting eddying friction and consequent fineness of subdivision or otherwise expediting the interaction of the admixed fluids; and, when one or both of the introduced fluids is preheated, thermal effects may easily be superadded, by the use of a unit of the character described, upon the effects emphasized above,—whether or not the flow of one of the mentioned liquids (introduced at a higher pressure) is employed as a means for advancing the other and the resultant mixture.

As illustrated in Fig. 3, in which P may be referred to as a pipe still comprising coils 39', led back and forth between baffles 40, and shown as having its exit 41 at a low level, dry steam may advantageously be fed, as by a valve pipe 42, into the end or direct inlet 14 of an interaction unit U, to whose main or lateral inlet 12 a crude oil, or the like, is admitted; and, if the dry steam is sufficiently hot, useful effects may be obtained even without the application of external heat, as by means of a flame 43, projected from a burner B into a fire box 44,— from which flue gases may ascend, in contact with the coil 39', to an outlet 45; but, when the introduced steam is not sufficiently hot to keep the mixture during its travel through the coil 39' (constituting a virtual extension of the passage 18 and preferably sufficiently restricted in diameter to assure turbulent flow) at a temperature such as 700° F., external heat may be applied in the manner suggested, or in any equivalent manner. Results achieved by the means and methods just described are notably superior to those heretofore obtained by, for example, the pumping of oil through an ordinary topping still into the bottom of which a small amount of steam is injected. By the use of this described organization, troubles with wet crudes are moreover entirely eliminated, and mixtures containing as high as 34%, or more, of water have been sent through a "still" of this type, with no trouble, a sweet and clean product, having a color No. 14 Saybolt, being directly obtainable from oils which had otherwise yielded tops having a dirty dark brown color. The use of my described organization has obviated carbon troubles and has resulted in a substantially increased yield, the amount of saving being dependent upon the kind of crude or other oil run.

The mixture passing the exit 41, or otherwise delivered from a pipe still organization of the character described, may be separated or utilized in any preferred manner, as by conducting the same through a valved pipe 46 to a suitable evaporating tower, or through a valved branch 47, to a suitable dephlegmating column; and, in Figures 4 and 5, I have shown diagrammatically an evaporating tower E and a dephlegmating column D; also respectively equipped with units of the general character above described. Such evaporators and dephlegmators may be used alternatively or in parallel or in series.

An oil mixture admitted from any source, as through an inlet 46', into the tower E (the upper portion of which may be provided with any preferred filling material, not shown), may immediately expand within said tower, above a baffle 48, or its equivalent, gases and vapors ultimately finding their exit through an outlet 49, at or near the top of the tower; and heavier fractions may be permitted to collect in a settling compartment 50, shown as provided with an outlet 51, having a guard 52 so disposed as to obviate direct outflow,—only the lowermost stratum of liquid being permitted to exit. The most unique feature of the evaporating tower disclosed in Fig. 4 may be the use, in connection with the parts described, of a unit U, to the side inlet 12 of which the oily mixture 53 is admitted, as by means of a pipe 54 connected with said unit and with an outlet fitting 55 at or near the bottom of the mentioned tower. A return pipe 56, serving the functions of the restricted turbulence passage 18 of Fig. 1, may be connected with the outlet opening 16 of the unit U and with an inlet fitting 57, shown as positioned below the baffle or splash plate 48, which serves as a guard therefor; and steam may be admitted, as through a valved inlet pipe 58, in sufficient quantity to assure a desired reheating and agitation and hydrogenation of the body of oil 53, vaporized portions of which may freely pass, as indicated by the arrow 59, into the upper portions of the tower E, and out through the top thereof.

Vapors from the pipe 49, or a mixture delivered from the branch 47 of the pipe still P, or its equivalent, or similar materials from any source, may be delivered, as through an inlet 60, into a dephlegmating column of any preferred design, the dephlegmating column D of Fig. 5 being shown as provided with substantially horizontal baffles 61 and with a splash plate 62 and a guarded outlet 63, the latter being optionally similar to the corresponding parts described in connection with the evaporating tower E of Fig. 4. To suggest the fractionation of the volatile product passing upward through the column D, the respective baffles are shown as cupped and provided with separate outlets 64, 64'; but, as in the preceding instances, the essential novelty of the column here referred to may be the use, in conjunction with the described parts, or their equivalents, of a unit U having an oil mixture inlet at 65 and a return passage 66, leading into the side of compartment 67, flow being maintained by the introduction of steam or its equivalent, through a valved pipe 68, and the described organization being effective to secure effects similar to those referred to in connection with my description of the evaporating tower E, of Fig. 4.

Heretofore, similar evaporating towers and dephlegmating columns, which may have a diameter of 10 or 12 feet, more or less, have been provided with means such as perforated pipes, for the introduction of live steam into the bottoms thereof; but, by the use of the described organizations comprising my novel units, an organization having a rated capacity such as 5000 barrels per day may be pressed to handle as high as 12000 barrels, with an increase of 4%, more or less, in gasoline per barrel handled, the products being sweeter and cleaner than heretofore, and rerunning being largely obviated.

Fractions, such as a gasoline distillate, or a water-white distillate, or a wax distillate, whether obtained directly or indirectly from the tower E or from the outlets 64, 64' of a dephlegmator D (as by means of condensers C, Fig. 12) or fractions from any other suitable source, may optionally be rerun in an expeditious and efficient manner by means such as the novel rerun organization shown in Fig. 7, this organization preferably comprising a horizontal still R, shown as provided at or near one end with a nozzle 69, (corresponding with the tubular element 17 of the organization shown in Fig. 1) connected with the outlet of a horizontally disposed interaction unit U', and as provided near the bottom of its opposite end with outlet means, which may comprise a float-controlled valve 70, by which a predetermined level may be maintained. Bottom heating means, such as a flame 71 projected from a burner B, or any preferred heating means, may be provided; and vapors may be continuously led out from the large vapor space into which the oil mixture is projected, as by means of a pipe 72, shown as connected with a dome 73; and a liquid residue may be continuously carried off, past the valve 70, as long as oil and steam, or their equivalents, are fed, as by the pipes 74 and 75, or their equivalents, connected with the respective inlets to the unit U'. Tops, lubricating oils, or any selected fractions may be rerun in this way in preference to the use of, for example, a batch process heretofore employed and commonly involving the introduction of live steam through a perforated pipe kept submerged; and the superiority of my organization and method just described may be adjudged from the fact that, whereas it formerly required from 35 to 42 hours to run a 350 barrel batch through a straight steam still running No. 1 tops, to obtain 74% Navy benzine, No. 10 color, (but requiring further treatment) my described organization has handled the same quantity of the same tops in 7 hours, yielding 89% Navy benzine, No. 16 color, which met all requirements without further treatment.

A gasoline or other product obtained from the outlet 72 of such a rerun still R, or from any other source, such as, for example, one of the outlets 64, 64' of a dephlegmating column D, in case the said product is not already suitable for its intended use, may advantageously be carried continuously through a treater or treaters T, of the general character shown in Fig. 6.

The treater shown in Fig. 6, in case the same is used for separate acid and soda treatments, may be subdivided into two main parts or sections T' and T'', shown as both supported from a channel iron frame 76, extending upward from a save-all 77. Each of these parts or sections may be provided with a unit U, through the lower or end inlet 14 of which the oil to be treated may be admitted under a suitable pressure; and the acid section T' may comprise an acid tank 78, a plurality of settling tanks 79, and one or more upright filters 80, the lower ends of the acid tank 78 and the lower ends of the settling tanks 79 being respectively provided with valved outlets 78$^a$ and 79$^a$ leading to a valved common return pipe 81, connected with the side inlet 12 of the unit U through which, as mentioned, gasoline is introduced. Acid may be admitted by a separate valved pipe 82, or its equivalent, at a suitable elevation and maintained at any preferred intermediate level above the bottom of the tank 78, means such as a gauging glass 83 being preferably employed to provide guidance in maintaining the desired level; and in order to permit and promote the desired interaction between the gasoline or other oil introduced through the inlet pipe 84, or its equivalent, with acid introduced through the pipe 82, or returned from the bottom of either of the tanks 78, 79 (all of the mentioned tanks and filters being shown as connected in series by pipes 85 extending above the tops thereof and entering adjacent tanks near the bottoms thereof) the turbulence pipe 86, instead of leading directly into the acid tank 78, or its equivalent, may advantageously be elongated, as by carrying the same to a comparatively high level, and then down again to, for example, the inlet 87 through which acid is admitted from the pipe 82. If desired, the settling tanks 79, or their equivalents, may be provided with separate gauge glasses (not shown) permitting observation of the quality and level of any settlings therein, and acid or settlings carried over into any of these tanks may be returned, at will, through the pipe 81; or samples may be drawn therefrom, as by means of the separate cocks 88. Cocks 89 may also be provided, for the withdrawal of samples from the respective filter tanks 80, which may be filled with any preferred filtering material; and oil escaping from the top of the last filter may be carried, as by means of a pipe 90, to the bottom inlet of an inter-action unit U, introducing the same into the alkali or soda section T'' of the treater, this section being similar in general arrangement to that already described.

For example, the section T'' may comprise a soda tank 91, settling tanks 92, wash tanks 93 and a final settling tank 94, the lower ends of the soda tank and the respective settling tanks 92 being connected, as by valved pipes 91$^a$, 92$^a$ with a valved common return pipe 95; and the outlet of the unit U, with which this pipe is connected, may be provided with an elongated turbulent flow pipe 96, leading upward to a comparatively high elevation and down again to an inlet 97,—through which soda may also be admitted, as by a valved pipe 98. Sampling cocks 99, 100 may be provided below all of the respective tanks 91-94 inclusive, or their equivalents; and wash water may be admitted to the tanks 93 in any suitable manner, as by means of inlet openings 101. It should be understood that the cocks 88, 89, 99 and 100 or their equivalents, may be employed not only for taking samples, but for the withdrawal of impurities; and that my described construction permits the introduced acid, alkali, or other reagent not only to be brought into effective interaction with the treated oil but to be repeatedly and continuously reused in a highly efficient and economical manner.

Gasoline to be treated for odor and color may be handled, by the described treater, at a saving amounting to as much as 11 cents per barrel of gasoline treated, and engine distillates, stove distillates, kerosene and even lubricating oils may be treated with corresponding advantage. As no air is required, the described organization has the merit, as compared with the old agitator system, that no compressor is necessary; no expensive foundations are required; there is no fire risk, all danger of explosion being eliminated; there are no evaporation losses; labor costs and time consumption are materially reduced; assuming the gasoline or other oil to be under a suitable head, no pumping is required, although the entire operation is under absolute control at all times. Acid costs and soda costs are materially reduced; the operation is rendered flexible and continuous, with a large capacity per unit; and the gasoline or other oil may be forced direct from running tanks while still hot, through my described treaters, and therefrom through an outlet 102 to loading tanks, or to any desired point of further treatment, use or storage. In the case of lubricating oils or other comparatively heavy stocks, the advantages of hot treatment, favorable to fluidity and rapid interaction with any purifying or other agent, may be of very great practical importance.

In a co-pending application (Serial No. 3,083, filed January 17, 1925) I have shown and claimed a somewhat specialized interaction unit of the general character illustrated in Fig. 9; but I find that highly advantageous results may be obtained by the use, in a treating organization of the character referred to and shown in Fig. 9, of the comparatively simple and universal type of interaction unit of which several uses have already been described. For comparison, I may state that the unit U'' disclosed in Fig. 9, which may be used in place of so much of the treater section T' as is shown at the left of the vertical line 103, or in place of the corresponding elements (comprising the unit U, the turbulence pipe 96 and the soda tank 91) of the treater section T'', is shown in Fig. 9 as comprising a partially cylindrical gasoline inlet end fitting 104, a shell or columnar portion 105, through which extend a plurality of turbulence tubes 106, an expanded cylindrical portion 107, constituting an outlet end fitting containing baffles 108, and optionally a substantially globular reflux chamber 109, shown as connected with the cylindrical portion 107 by a constricted passage 110,—acid being admitted at an intermediate level, as through an inlet 111, and the treated oil, containing more or less of entrained acid, being delivered through outlet 112, connected with a series of settling tanks, filters, or their equivalents, substantially as shown in Fig. 6. In this form of interaction unit, the turbulence pipes 106, corresponding in function to both the passages 22 and the turbulence pipe 17 of the unit of Fig. 1, may be supported by means such as an apertured plate 113 and spiders or spacers 114 and 115, in such manner as to permit a return flow of acid or heavier particles, such as may coalesce upon or be stopped by or within the cylindrical baffle chamber 107 or the globular reflux chamber 109, the heavy particles referred to being permitted to descend, outside the tubes 106, within the columnar portion 105, repeatedly reentering the lower ends of the tubes 106, constricted at 116, into which the nozzles 117, integrally or adjustably secured in a plate 117', project. When desired, a residue may be drawn off through a valved outlet 118, or its equivalent; but, as in the treater illustrated in Fig. 6, the same quantity of acid or other reagent may be repeatedly reused, as by returning the same from the settling tanks 79, through a common return pipe 81, which may be connected with the columnar portion of a treater such as is shown in Fig. 9, as by a valved inlet 119.

In either of the treating organizations described, gasoline, or the like, may be admitted at a pressure such as 70 pounds per square inch, and the pressure drop within each treater section, including a unit of the character illustrated in Fig. 6, may amount to 30 pounds, more or less. In certain cases, as suggested in the diagram constituting Fig. 12, I may prefer to employ, in a treater section T', a unit of the character illustrated in Fig. 9, simultaneously using, in the treater T'', a unit of the character illustrated in Figs. 1 and 2; or the units may be oppositely arranged, according to the character and condition of the oil treated.

In an organization of the character last described, or in analogous organizations for continuous treatments, I may use, in tandem, any suitable plurality of units of either of the sorts described, or their equivalents; but my units may also be used in parallel, as in modernizing a group of agitators of a type heretofore standard. For example, as suggested at AG in Fig. 12, I may connect the conical bottom of an agitator with a main from which branches may extend to four or five or another suitable number of interaction units U, to which an entrainment fluid may be admitted by separate pipes, the outlets of the mentioned units being connected with a common return pipe in such manner that, acid or another reagent being optionally admitted (as by valved pipes not shown), an extraordinarily efficient agitation and subdivision within separate streams, repeatedly fed through the separate units may be supplemented by a turbulent flow through the return pipes therefrom, to expedite a rapid attainment of equilibrium, with corresponding economy in reagents and in time required.

An agitator organization of the type here referred to may be used with exceptionally advantageous results in air-blowing certain California oil fractions, or other oil fractions, as for the production of mineral oils suitable for medicinal use. The product sold under the trade name "Nujol" (the exact composition of this substance being unknown to applicant and immaterial to the present invention) is an example of the type of blown oil to which a specially equipped blowing agitator B (using air both as an entrainment fluid, and as an oxidizing agent) is especially suitable; and the desired effects may be accelerated by the introduction of the air at a temperature such as 400° to 700° F., volatilized products being permitted a free escape, in the usual manner. As is well known, a product obtained by the blowing of a suitable California oil fraction is readily marketable at a price more than offsetting the loss resultant from evaporation; but my described process, more expeditious and economical than any method heretofore used for the purpose referred to, effects important economies both in time and materials.

Figure 12:
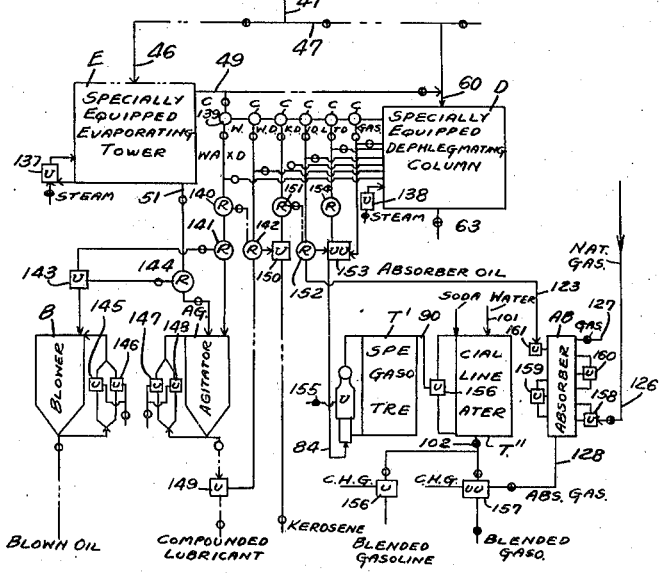
Fig. 12 is a general view illustrating a possible assembly of stills, towers, columns, agitators, treaters, and the like, in a plant making extensive use of interaction units of one or another of the types illustrated in the preceding figures, this figure being entirely diagrammatic but adapted to serve also as a flow sheet.

As diagrammatically suggested in Fig. 12, any desired number of my interaction units may be used, for the purpose referred to in any parallel relationship, in expediting the treatment and retreatment of thin streams of oil, thermal and chemical effects being in this case superadded to the effects of fine subdivision, turbulent flow and variations in pressure.

In Fig. 10 I show diagrammatically an exceptionally effective absorber organization AB, in which a plurality of my interaction units are used in series, but in such manner that the general direction of advance of the oil is nevertheless opposite to that of the gas. In this apparatus, operating upon a countercurrent principle, I may employ any desired number of superimposed chambers 120, each shown as provided with an inlet 121, through which a turbulent and fine admixture of gas and oil may be projected against a baffle or baffles, as suggested diagrammatically at 122. Fresh oil may be admitted, as from a pipe 123, through a unit U delivering into the uppermost chamber; and such oil as settles in the bottoms 124 of the respective chambers above the lowermost chamber may descend, as through pipes 125, to be projected by means of like units into each next lower chamber,—the freshest gas, fed from a pipe 126, preferably entering the lowermost chamber and being ultimately permitted to escape through an elevated gas outlet 127, shown as extending upward from the top of the uppermost chamber 120. Oil, completely saturated with gas, may find exit through an outlet 128, shown as positioned near the bottom of the lowermost of the chambers 120; and the product may be used as delivered from this outlet, or treated or blended in any desired way.

It may be noted, in connection with the simple and early form of unit U', shown in Fig. 8, that this unit comprises, at its opposite ends, somewhat similar dished heads 13ª and 15ª, corresponding respectively to the cylindrical inlet fitting 13 and the outlet fitting 15 of the unit U, shown in Figs. 1 and 2, the interior construction of the two units being optionally the same, except as, for example, the ratio of the length to the diameter of the passages 22 (or 22'), may vary according to the requirements of an intended use; but the units U', of the general character shown in Fig. 8, may be entirely adequate for many uses in addition to those suggested in Figs. 7 and 10 in which, although promoting admixture and turbulent flow, it is used for the purpose, among others, of projecting an oil horizontally or otherwise, into a still or absorber. In cases of this sort, the delivery nozzles 69, although contributing to a turbulence promotive of fine subdivision and interaction, may be regarded as serving incidentally for the projection of the mixture in a predetermined direction.

Either of the units shown in Figs. 1 and 2 or in Fig. 8 may be found entirely adequate to such purpose as the blowing of oils or the blending of gasolines; and, although I generally prefer to introduce the thinner or lighter fluid through the end inlets 14 (or 14ª) of my units, this mode of introduction may become relatively unimportant when the fluids to be blended are very similar; and, in any event, the use of my units for the purpose last referred to has the important advantage over the common open tank methods in current use that complete admixture may promptly be effected substantially without loss due to evaporation. Either or both of the introduced fluids may be delivered to my units under a pressure sufficient to insure jetting and turbulent flow, and the loss in volatile constituents, which has heretofore run as high as 20% and may have averaged about 5%, is, by my procedure, reduced to about 1%, or even practically to zero.

In the compounding of lubricating oils, which are seldom used as they come from the refinery, there can, of course, be no important saving of volatile constituents; but the use of my units nevertheless greatly simplifies and improves the technique of compounding. No air compressor is used to provide for agitation; and a completely homogeneous mixture may be quickly and reliably obtained at small cost. The blending of comparatively heavy fractions may in fact be advantageously completed while they are still hot, my mixers being optionally interposed in pipes leading to storage tanks.

In the above described forms of interaction units, the interior nozzles, used for a jetting of oil, steam, air, or the like, are shown as arranged in a single circular series and as integral with a supporting plate; but, as suggested in Fig. 11, I may optionally provide, even within a unit of substantially the same diameter as either of the units referred to, a lesser or a greater absolute number of jetting nozzles and cooperating turbulent flow passages; and I may optionally employ, in this connection, a construction permitting various adjustments and permitting also the simultaneous introduction of more than two fluids, the features here referred to being favorable to the adaptation of my units to the treatment of fluids differing widely in viscosity. For example, the shell of the unit UU, Fig. 11, may comprise separate sections 11ᵇ, 11ᵇ', each shown as provided with an inlet and as adapted to cooperate not only in the retention of a nozzle plate or a tube plate (19$^b$ or 37$^b$, corresponding with the plates 19 and 37 of Fig. 1) but as also engaging an intermediate plate 130. In this construction, the nozzles 20$^b$ are shown as adjustable in the plate 19$^b$, and the tubes providing turbulence passages 22$^b$ are adjustable in the plate 37$^b$; and intermediate elements comprising both turbulence passages and nozzles may be adjustably supported by the intermediate plate or plates 130. For example, short tubes 131, shown as provided with constrictions 132, may be adjusted within a continuously threaded passage 133, and nozzles 134, externally threaded at 135, may be similarly and independently adjustable, within the same passages. The end fittings 13$^b$ and 15$^b$ employed in an organization of this character may be similar to the corresponding elements 13 and 15 of Fig. 1; and bolts 7$^b$, or their equivalents, may be employed to hold all of the mentioned parts in their assembled relationship, gaskets 26$^b$ being interposed in an obvious manner; but it will be recognized as optional whether I employ one set of long bolts, as in Fig. 11, or separate sets of short bolts, as in Fig. 9, or other means equivalent to the mentioned longitudinally extending threaded elements. By providing a plurality of lateral inlets, as at 12$^b$ and 12$^{b'}$, I am enabled to admit any number of fluids, as for the purpose of blending the same in a single unit; or I may admit a gas through an intermediate side opening, for the purpose of absorbing the same in an oil or oils admitted through other openings; but the described means, or equivalent means for adjusting the interior parts may be employed in connection with any of the units previously mentioned.

In Fig. 11 I have shown the unit UU as disposed with its outlet at the bottom thereof, this orientation being favorable to a utilization of gravity in drawing thin fluids, such as gasolines to be blended, through a unit of the character described and into a turbulent flow pipe, of any desired length, therebelow; but it will be obvious that a single unit of the character illustrated in Figs. 1 and 2, or a plurality of such units arranged either in parallel or in tandem, may suffice for all ordinary purposes, and that the manipulation of valves externally disposed may satisfy all usual requirements of regulation or adjustment.

I emphasize once again the fact that an organization such as is shown in Fig. 3, referring to the same as a specially equipped pipe still, may optionally be employed incidentally or exclusively for such a purpose as the hydrogenating or the dehydrating of an oil. My units may thus serve to effect a separation rather than a mere admixture; and, although motion of some sort may be essential to the rapid interaction of fluids, it should be understood that mere transport is, in none of the described organizations, the sole object or function of my novel units.

In Fig. 12 I have suggested a somewhat comprehensive layout or refining scheme beginning with the delivery of a suitable crude oil, admixed with dry steam, into a specially equipped pipe still, and terminating in the recovery of several products, including blended gasoline, kerosene, a compounded lubricant, and a blown oil; but I show in this figure only those elements of a complete plant in connection with which the use of one or more of my mentioned units has been above suggested. The dotted portions of the respective pipe lines may be construed as indicating optional or obvious gaps in apparatus or treatment; but Fig. 12 is intended both to emphasize the wide variety of uses to which my units may be put, and also to outline a general process to which all my procedures mentioned above may be regarded as subordinate. In all cases of possible ambiguity, arrows are employed to indicate an intended direction of flow; and valves are interposed at many points, either for the purpose of indicating a possibility of working under a pressure above normal or for the purpose of indicating that a flow may be diverted entirely from one path, or divided between two optional paths.

An oil and steam mixture flowing from the specially equipped pipe still P, or its equivalent, shown in Fig. 12 as fed by means comprising the interaction unit U136, may be sent, as by pipes 46 and 47, to either or both the evaporator E, specially equipped with a unit U137, and to a dephlegmator D, specially equipped with a unit U138, or through such an evaporator and such a dephlegmator in series; and separately obtained fractions from either of these sources (disregarding such fractions as may already be suitable for an intended use) may, for example, be treated as follows.

A wax distillate or a mixture of wax distillates coming from either or both a condenser 139 and from one of the offtakes of the dephlegmating column D (in case the latter is equipped for fractionation) may pass through successive rerun stills, as R140 and R141; the condensed vapors from the former being shown as carried toward an additional rerun still R142, provided for the treatment also of a water-white distillate. The vapors from the still R142 are shown as united, in a unit U143, with a fraction evolved from a rerun still R144, handling a portion of the residue from the bottom of the evaporating tower E, as for the production of a stock to be air blown in a blower B. This blower is shown as provided with units U145 and U146; but a greater number of units may preferably be disposed in parallel; and the relationships suggested are, in any event, merely illustrative. The oils and fractions referred to may be kept hot throughout the described course of treatment.

Residues obtained from, for example, rerun stills R141 and R144 may be treated separately or in admixture, as by purifying the same with usual reagents in an agitator AG, modernized in the manner suggested above and using an entrainment fluid fed through parallel units U147 and U148, for the production of, for example, a lubricant. By means such as a unit U149, a supplemental lubricant fraction, such as a purified residue obtainable from the rerun still R142, may be compounded with the product obtained from the agitator AG or its equivalent, for the production of a complete lubricant mixture meeting prescribed specifications.

Throughout the described steps and optional additional steps hereinafter suggested, the oils and fractions here referred to may be handled in a continuous manner, without being permitted completely to cool; and it should be understood that (as in the case of pipe stills P, segregating organizations E and D, rerun stills R, treaters T and absorbers AB) the modernized agitators AG and the air blowers B, or equivalent organizations comprising interaction units interposed in closed paths must be regarded as capable of optional use in a continuous manner, the introduced fraction, mixture or residue being preferably kept at an elevated temperature by the means described or by similar means while new oil is suitably fed in at one point and the desired product is gradually withdrawn from another.

A fraction recovered from the vapors of, for example, the rerun still R142 may be blended, as in a unit U150, with a kerosene distillate, whether or not the latter is first rerun, as in a still 151, to separate a fraction suitable for further rerunning (as in a still R152) with an intermediate distillate, for the separation of gasoline and absorber oil fractions, or the like. If desired, a triple-inlet unit UU153, which may be of the type illustrated in Fig. 11, may be used in promoting the blending of a gasoline residue (such as may be obtained from a rerun still R154 handling a light distillate) simultaneously with fixed hydrocarbon gases from such a source as the dephlegmating column D and with a gasoline fraction condensed from, for example, the vapors evolved from the rerun still R152, or its equivalent; and either a straight gasoline or a gasoline blend or fraction obtained as above or in any other suitable manner may be purified as above described by means such as a treater T, shown as equipped with units U"155 and U156. This treatment may be executed while the gasoline fed is still hot. It is to be understood that treaters T may advantageously be used in a similar manner in the purification of fractions heavier than gasolines; and I suggest, at the bottom of Fig. 12, both the use of a unit U156 to blend a treated gasoline with a casing head gasoline and the use of a unit UU157 for the simultaneous blending of a treated gasoline with casing head gasoline and with an absorber gasoline. The latter is indicated as derived from the absorber AB—whose oil inlet leads from the residue outlet of the rerun still R152, and whose units U158, U159, U160 and U161 may be supplied with natural gas, or the like, through the valved pipe 126.

My units need comprise no parts relatively movable during use; and although I have alluded to the general structural similarity of some of my interaction units to certain types of so-called "jet pumps" or "steam pumps" in current use, I again call special attention to the fact that my units, differing therefrom in various features of construction and operation which are favorable to their intended uses and to an easy cleaning and substitution or adjustment of parts, are not, in any of the above numerous illustrations of their use, employed for the mere purpose of using the energy of one fluid in transporting another; but all of my interaction units may be said to comprise hydraulic means for producing jets or a fine subdivision of fluids and for subsequently maintaining turbulent flow,— preferably during variations in pressure and optionally in conjunction with thermal or chemical effects, or both. Toward assuring the proper use of my units, they may be optionally constructed integral with or sold with turbulence pipes of a suitable diameter to assure turbulent flow therein and therefrom, under stated conditions of use; but protection is sought not only upon the novel features of my units as such, but upon the respective organizations and the general plant arrangement in which they are comprised, and also upon the novel method and various described subprocesses whose execution they render possible. The use of my units, acting intensively upon small streams of the interacting fluids, greatly enhances the practicability of continuous operation and the avoidances of heat losses between successive steps. Elevated temperatures are of course favorable to low viscosity, with consequent fine subdivision, turbulent flow and rapid interaction; and the savings which my means and methods permit in the combustion of fuel constitute no inconsiderable addition to the mentioned savings in time, materials, equipment and attention. In conclusion, it should be emphasized that various features of my invention are capable of independent use, and also that modifications of the same too numerous to mention may easily be devised by those skilled in the art to which this case relates without the slightest departure from the spirit and scope of my invention, as the same is indicated above and in the following claims.

I claim as my invention:

1. An interaction unit suitable for use in the treatment of oils and comprising: a shell provided with an outlet opening and with an inlet opening for one fluid; separately removable means therein for producing a fine subdivision of a fluid admitted through another inlet opening; and separately removable means for maintaining, for a desired interval of time, turbulent flow of a resultant admixture of said fluids.

2. An oil treating device which comprises: means for producing fine subdivision by jetting one fluid within another while both fluids are advancing in the same direction; and separately removable means for producing and maintaining, for a predetermined period of time, a turbulent flow within the resultant mixture.

3. An organization as defined in claim 1, in which said unit comprises end fittings providing chambers interiorly bounded by transverse plates.

4. An organization as defined in claim 1, in which said unit comprises end fittings providing chambers interiorly bounded by transverse plates and in which the edges of said shell and the edges of said fittings engage said plates.

5. An organization as defined in claim 1, which comprises end fittings provided with flanges and in which the described parts are held in their intended relationships by bolts extending through the flanges provided on said end fittings.

6. An organization as defined in claim 1, in which said outlet opening has a transverse area greater than the sum of the transverse areas of said inlet openings.

In testimony whereof, I have hereunto set my hand at Los Angeles, California, this 5th day of March, 1925.

EDWIN C. WEISGERBER.